June 11, 1968  W. SIEPMANN  3,387,818
WEDGE MEANS FOR GATE VALVES
Filed March 28, 1966  2 Sheets-Sheet 1

INVENTOR.
WALTER SIEPMANN
BY *Michael S. Striker*
ATTORNEY

United States Patent Office 3,387,818
Patented June 11, 1968

3,387,818
WEDGE MEANS FOR GATE VALVES
Walter Siepmann, Belecke (Mohne), Germany, assignor to Stahl-Armaturen Persta G.m.b.H. KG., Belecke (Mohne), Germany
Filed Mar. 28, 1966, Ser. No. 538,063
Claims priority, application Germany, Mar. 31, 1965, St 23,601
6 Claims. (Cl. 251—327)

ABSTRACT OF THE DISCLOSURE

An elastic wedge means for gate valves adapted to be guided on guide ribs of a valve housing and composed of a pair of identical wedge shaped plates of substantially circular contour arranged spaced from each other, each of the plates having at the sides thereof facing away from the other plate an annular seat portion with an end face inclined with respect to a plane of symmetry located between the plates, a substantially central connecting portion projecting from the other side of each plate, and a pair of guide wings projecting laterally in opposite direction from each plate; and connecting means located between the plates and connected to the connecting portions for holding the plates either releasably or permanently in firm position relative to each other. The wedge shaped plates including the connecting portion and guide wings are shaped so as to be best suited for forming the plates by die forging.

---

The present invention relates to elastic wedge means for gate valves of large diameter which basically comprise a pair of forged identical wedge-shaped plates of substantially circular contour arranged spaced from each other in mirror image relationship and having at the outer faces thereof annular seat portions inclined in direction of the corresponding wedge-shaped seats of the valve housing and provided with substantially radially extending guide wings adapted to cooperate with a corresponding guide rib on the housing. The wedge means further include connecting means located between the wedge-shaped plates for connecting the plates to each other in a fixed position and serving also for the attachment of an operating spindle to move the wedge means relative to the valve housing between an open and a closed position.

Two different modifications of the above described elastic wedge means are in demand. In one modification the two wedge plates are fixedly connected to the connecting means located therebetween by providing for instance on each wedge plate a central trunnion extending in corresponding bores of the connecting member between the plates and being welded thereto, whereas in the second embodiment the two wedge plates are removably connected to the connecting member whereby preferably a distance ball is located between facing portions of the two wedge plates.

Due to this desired different connection of the wedge plates to each other it has heretofore been considered necessary to manufacture two different kinds of wedge plates. The plates of the wedge means are die-forged from substantially cylindrical blanks or billets and this die-forging of the plates requires, especially for plates of great diameter, of for instance 300 mm. and more, not only a considerable forging pressure, but also large and expensive forging dies. Heretofore, different forging dies were considered necessary for forging the plates of the above-mentioned two modifications of the wedge means, which evidently greatly increases the manufacturing cost thereof.

Furthermore, in order to assure proper and trouble-free operation of the wedge means, it is highly desirable that the wedge means during their movement thereof relative to the valve housing are properly guided by guide members on the wedge means adapted to cooperate with corresponding guide portions on the valve housing. In the modification in which the two wedge plates of the wedge means are removably connected by connecting means to each other, appropriate guide ribs have heretofore been provided on the connecting member which evidently required different sizes of connecting members for valves of different diameters. In the modification in which the two plates of the wedge means have been connected by welding to the connecting member the aforementioned guide means have been omitted in order to reduce the size of the wedge means and in order to provide a simplified connection, but this evidently resulted in an inferior product.

It is an object of the present invention to provide for wedge means of the aforementioned kind which are provided with proper guide means for guiding the wedge means during the movement thereof in the valve housing between an open and a closed position.

It is an additional object of the present invention to provide for elastic wedge means of the aforementioned kind in which the two plates of the wedge means are constructed and arranged in such a manner that they can be manufactured in a very efficient manner and at reasonable cost by forging.

It is a further object of the present invention to provide for wedge means of the aforementioned kind in which the two wedge plates are provided with appropriate guide wings and simple means for preventing turning of the wedge plates relative to each other and in which the two wedge plates are forged with a central connecting portion constructed in such a manner that it can be easily adapted for fixedly connecting the wedge plates to connecting means located therebetween by welding or for removably connecting the two plates to connecting means located therebetween.

In this way only one set of forging dies is necessary for the manufacturing of wedge means of a certain size regardless whether the plates of the wedge means are fixedly or removably connected to each other. In addition, by providing the guide wings directly on the wedge plates, the connecting means can be greatly simplified and the same kind of connecting means or connecting member may be used for wedge means of different size, and the connecting member which can be manufactured independently of the size or diameter of the wedge means may be held to the smallest possible dimensions.

With these objects in view, the elastic wedge means for gate valves according to the present invention which are adapted to be guided on guide ribs on a valve housing mainly comprises a pair of identical wedge-shaped plates of substantially circular contour arranged spaced from each other and symmetrically with respect to a plane of symmetry located between the wedge-shaped plates, each of the plates having at the side thereof facing away from the other plate an annular seat portion having an end face located in a plane inclined to the aforementioned plane of symmetry and at the other side thereof a connecting portion located substantially at the center of each plate, and a pair of guide wings respectively projecting to opposite sides of each plate. Each of the guide wings on one plate has a guide face substantially parallel to the aforementioned plane of symmetry and being spaced and facing a corresponding guide face on the corresponding guide wing on the other plate so that the wedge means may be guided on guide ribs of the housing located between the guide faces. The elastic wedge means further includes connecting means for holding the plates in a fixed position relative to each other and the connecting means are located between the plates and connected to the connecting portions thereof. The wedge plates including the connecting portions and guide wings are shaped and arranged in such a manner so as to be best suited for forming the wedge plates by die-forging.

According to a further development, each of the connecting portions of each plate is provided at the face thereof facing the corresponding portion of the other plate with a central cavity having a surface forming part of a sphere, and when the connecting means are constructed to removably connect the two plates of the wedge means to each other a spherical distance member is located between the plates in the cavities of the connecting portions thereof, whereas when the plates are fixedly connected to each other the connecting means includes a substantially spherical end portion located and filling the aforementioned cavity and being fixedly secured thereto by welding.

In the first mentioned case the connecting portions of the plates and the connecting means are provided with circumferentially spaced radially projecting ridges interengaging each other and forming a bayonet joint so that the two plates are removably connected with each other, and in the second case each of the plates is preferably formed with a central bore extending from the outer surface thereof through the connecting portion into the spherical end portion of the connecting means and these bores are filled with welding material to fixedly connect the end portion of the connecting means to the plates.

In this way it is possible to modify by a simple machining operation identically forged wedge plates in such a manner that the wedge plates may either be removably connected to each other by a correspondingly shaped connecting member, or that the wedge plates may be fixedly connected by welding to a different connecting member. In each case the connecting member will be relatively simple and connecting members for different sizes of wedge means may be made to the same size since the guide wings are directly provided on the wedge plates.

In a preferred and especially advantageous construction according to the present invention, each of the wedge-shaped plates is in the form of a shallow cup open toward the other plate and the shallow cup has an inner bottom face substantially parallel to the end face of the seat portion of the respective plate and an annular rim projecting from the bottom face toward the other plate and increasing in height from the narrow to the wide end of the wedge means. This annular rim has preferably an end face located in one plane with the aforementioned guide faces of the guide wings on the respective plate and the connecting portion of the plate is located in the space surrounded by the rims of the two plates.

The wedge plates of the aforementioned kind may be forged from cylindrical blanks or billets to substantially rigid bodies with relatively small wall thickness. An essential advantage of the aforementioned construction resides in the fact that the bottom of the shallow cup is located closely adjacent to the seat portion of the plate, whereas the annular rim provides for a substantially closed inner space especially adapted to receive a connecting member of relatively small dimensions between the plates. Furthermore, the cup-shaped form of the plates permits also to provide the guide wings closely adjacent to the plane of symmetry of the wedge means and, in addition, the means for preventing turning of the plates relative to each other can be provided in a very simple manner by forming in the annular rim of each plate in the region of the greatest height thereof a recess through which a portion of the connecting means may extend with small clearance to prevent thereby turning of the plate relative to each other. Separate means to prevent turning of the two plates relative to each other are therefore not necessary with the construction according to the present invention. All means for properly guiding the plates and preventing turning of the same relative to each other are therefore arranged in an extremely simple manner and in such a way that the plates may be forged in an efficient manner and to the smallest possible dimensions.

An additional advantage of the aforementioned construction is that the forging fin along the annular rim and the guide wings will be located in one plane. This will greatly simplify the construction of the forging dies as well as the necessary finishing operation of the forged blank.

The form of the wedge plates according to the present invention also permits to forge the plates from stamped disks which are often available as by-products in forging plants.

According to a further development of the present invention, the operating spindle may be provided with a shaft portion of enlarged diameter adjacent to the end thereof which is connected to the connecting member between the plates and the enlarged shaft portion extends with small clearance through the passage formed by the aforementioned recesses in the rim portions of the two plates to serve thereby as a means preventing the two plates to turn relative to each other.

As mentioned before, the connecting means for the two plates may be constructed independent of the diameter of the plates, that is connecting means of identical size and configuration may be used with plates of different diameters which further greatly simplifies manufacturing of the wedge means according to the present invention. This advantage is essentially obtained due to the fact that the guide wings are directly provided on the plates and not on the connecting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
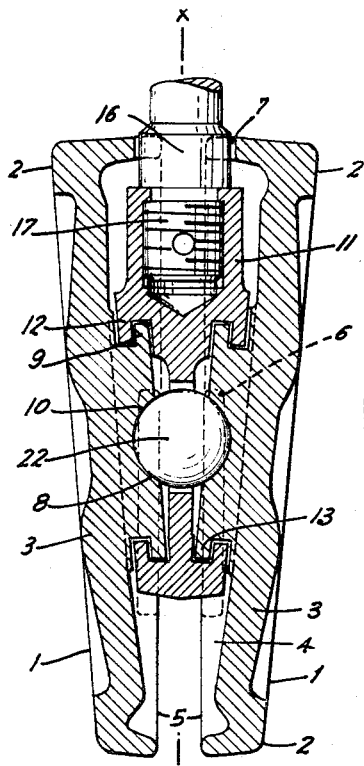
FIG. 1 is a vertical cross section through one embodiment of the wedge means according to the present invention.
Figure 2:
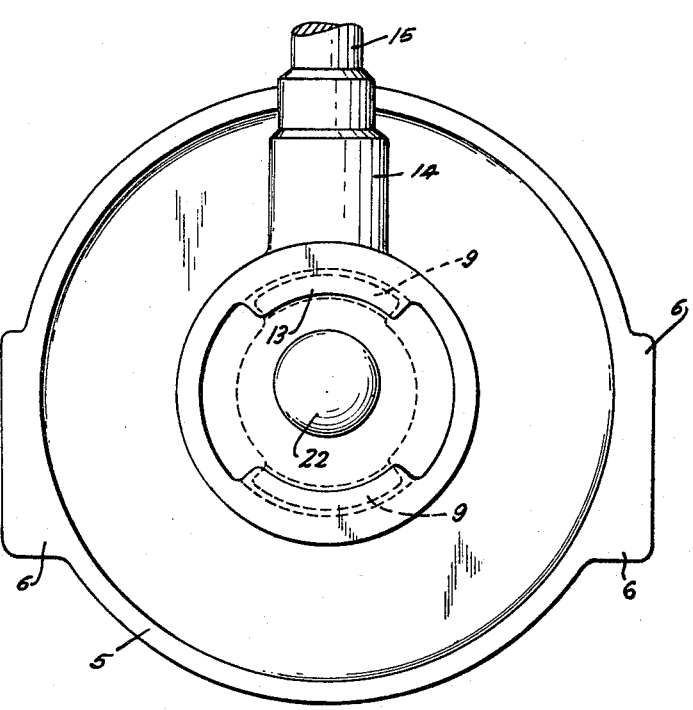
FIG. 2 is a side view of the arrangement shown in FIG. 1 with one of the wedge plates removed.
Figure 3:
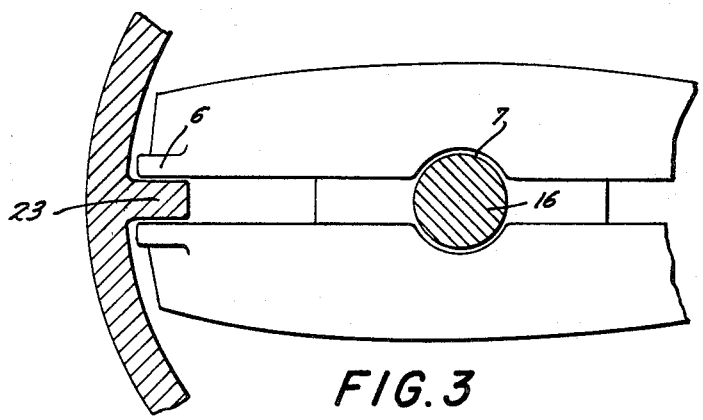
FIG. 3 is a partial cross section transverse to the axis of the wedge means and also showing part of the valve housing.

Referring now to the drawings, and more specifically to FIGS. 1–3 of the same, it will be seen that the elastic wedge means according to the present invention illustrated in these three figures mainly comprise a pair of identical wedge shaped plates 1 of substantially circular contour arranged spaced from each other and symmetrically with respect to a plane of symmetry located between the wedge-shaped plates 1. Each of the plates 1 has at the side thereof facing away from the other plate an annular seat portion having an end face 2 located in a plane inclined to the plane of symmetry. Each of the wedge shaped plates 1 is in the form of a shallow cup open towards the other plate whereby the bottom 3 of the cup respectively the inner surface of this bottom extends substantially parallel to the plane in which the end face 2 of the seat portion of the respective plate is located. Each of the cup-shaped members 1 has further an annular rim portion 4 having an inner end face 5 substantially parallel to the aforementioned plane of symmetry, that is substantially parallel to the spindle axis X—X. The annular rim 4 increases in height from the lower to the upper end of the wedge means. Each of the plates 1 includes further a pair of guide wings 6 projecting in substantially radial direction from opposite sides of the rim and each of the guide wings of one plate has a guide face facing the corresponding guide face on the opposite guide wing on the other plates, and the guide faces of the guide wings 6 are located in one plane with the end face 5 of the annular rim of the respective plate. The guide faces of the guide wings 6 of the opposite plates are adapted to cooperate with corresponding guide rim ribs 23 on the valve housing as schematically illustrated in FIG. 3 so as to guide the wedge means during movement thereof relative to the valve housing. Each of the annular rims 4 is further provided in the region of the greatest height thereof with a recess 7 of substantially semicylindrical configuration which is adapted to cooperate with a portion of a guide spindle 15 in a manner as will be explained in further detail later on to prevent turning of the two plates 1 relative to each other.

Figures 4, 5:
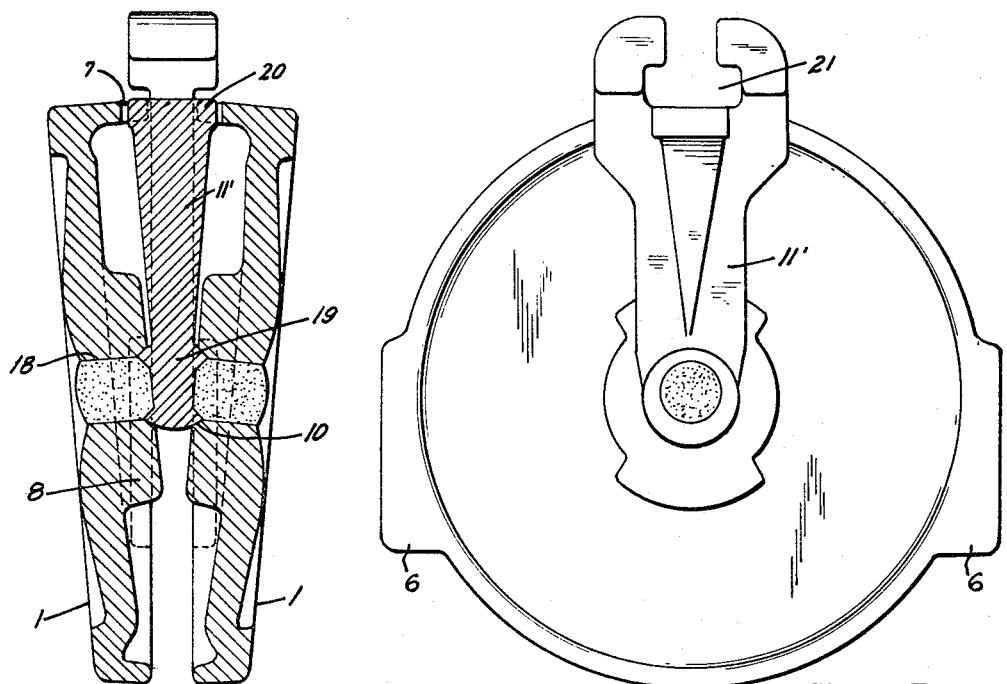
FIG. 4 is an axial cross section through a second embodiment of the wedge means according to the present invention.
FIG. 5 is a side view of the embodiment shown in FIG. 4 with one of the plates removed.
Figures 6, 7:
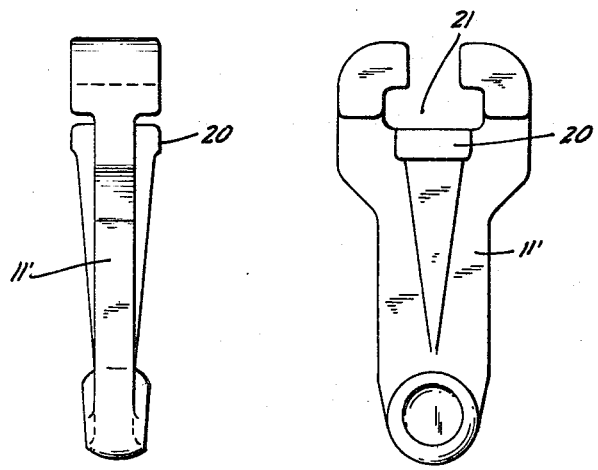
FIG. 6 is a front view of the connecting means of the embodiment shown in FIG. 4.
FIG. 7 is a side view thereof.

Each of the plates is further provided with a central connecting portion 8 projecting inwardly from the bottom 3 and the connecting portion 8 is of substantially cylindrical configuration and in the embodiment as shown in FIGS. 1 and 2 provided with two laterally extending wings 9 adapted to cooperate with corresponding wings and cut-outs in connecting means as will be described later on to form a bayonet joint. Each of the plates 1 may be forged to the above-described configuration, preferably with a central cavity 10 in form of a spherical segment in the connecting portion 8 from a billet or from a substantially cylindrical member and two of such forged plates may be used after an additional machining operation for forming wedge means as shown in FIGS. 1 and 2 in which the wedge plates are removably connected to each other, or for forming wedge means as shown in FIGS. 4 and 5 in which the two wedge plates are fixedly connected by welding in a manner as will be described in detail later on.

In the arrangement as shown in FIGS. 1 and 2, the connecting portion 8 is machined to provide undercuts beneath the wings 9 so that the latter are adapted to interengage with cooperating portions of the connecting means. The connecting means or plate holder 11 of the embodiment shown in FIGS. 1 and 2 is provided on an annular main portion thereof with a pair of opposite and radially inwardly extending circular segments 12 which are formed with undercuts to form claw-like members 13 adapted to cooperate with the wings 9 on the connecting portions of the plates to form therewith a bayonet joint. The bayonet joint formed by the wings 9 and the claws 13 is enclosed in the space between the annular rims 4 of the two plates 1 joined together by the connecting means or plate holder 11. The plate holder 11 has further an upwardly extending tubular projection 14 provided with an inner screw thread in which a correspondingly threaded end portion 17 of an operating spindle 15 is threaded. The operating spindle has a shaft portion 16 of enlarged diameter which extends through the passage formed by the opposite recesses 7 formed in the region of the greatest height of the rims 4.

The essential and advantageous features of the wedge means above-described are that the guide wings 6 and the recesses 7 are directly provided on the annular rim 4 of each plate which results in a plate configuration forming a simple and relatively rigid wedge plate 1 of a shape best suited for forming the wedge plate by die-forging and which permits also to use connecting means or plate holders of small dimensions resulting in a very compact and rugged wedge means.

The arrangement illustrated in FIGS. 1-3 includes further a ball 22 located in the central spherically shaped cavities 10 of the connecting portions 8 of the two plates.

The embodiment shown in FIGS. 4 and 5 comprises also a pair of wedge-shaped plates 1 which are forged to the same configuration as the wedge plates described above in connection with the embodiment illustrated in FIGS. 1 and 2. In this embodiment the two wedge plates are not removably connected to each other, but welded at the central portion thereof to connecting means or plate holder 11'. Therefore, the connecting portion 8 of each wedge plate has not to be formed with undercuts to form cooperating portions of a bayonet joint. The plate holder or connecting means 11' of this embodiment is formed with a substantially spherical end portion 19 which is located in the cavities 10 formed in the end faces of the connecting portions 8 of the two plates. Each of the plates is formed with a central bore 18 extending from the outer surface thereof through the respective connecting portion 8 and into the spherical end portion 19 of the plate holder 11'. After the angular position of the two plates 1 is properly adjusted according to the inclination of the seat portions in the valve housing, the plates are connected to the plate holder 11' by welding, whereby the welding material substantially fill the bores 18. Experience has shown that the welding can be performed in this manner without changing the spacing between the two plates 1 or their relative inclination.

The connecting member 11' extends through the passage formed by the recesses 7 in the annular rims 4 of the two plates and the connecting member 11' is provided with lateral projections 20 respectively located with a small clearance in the recess 7. The connecting member 11' is formed at the upper end thereof with a substantially T-shaped slot adapted to receive a corresponding end portion of an operating spindle.

The above-described construction illustrated in FIGS. 4 and 5 provides for a perfect substantially homogeneous and sufficiently elastic connection between the two plates. The welding material placed into the bores 18 will during the welding operation perfectly fuse to the surface portions defining the bores and the cavities in the end portion of the connecting member 11'.

It will be understood that each of the elements described above, or two or more together, may also find a useful application in other types of elastic wedge means for gate valves of large diameter differing from the types described above.

While the invention has been illustrated and described as embodied in elastic wedge means for a gate valve of large diameter including two wedge-shaped forged plates removably or fixedly connected to each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Elastic wedge means for gate valves and adapted to be guided on guide ribs on the housing of the valve comprising, in combination, a pair of identical wedge-shaped plates of substantially circular contour arranged spaced from each other and symmetrically with respect to a plane of symmetry located between said wedge-shaped plates, each of said plates being in the form of a shallow cup open toward the other plate and having at the side thereof facing away from the other plate an annular seat portion having an end face located in a plane inclined to said plane of symmetry, and at the other side thereof a connecting portion located substantially at the center of each plate and projecting toward the other plate, said connecting portion of each plate being provided at the face thereof facing the connecting portion of the other plate with a cavity having a surface forming part of a sphere, and a pair of guide wings respectively projecting to opposite sides of each plate, each of said guide wings on one plate having a guide face substantially parallel to said plane of symmetry and being spaced from and facing a corresponding guide face on the corresponding guide wing of the other plate so that said wedge means may be guided by means of said guide faces on guide ribs of the housing located between said guide faces; and connecting means for holding said plates in firm position relative to each other, said connecting means including a substantially spherical end portion located in and filling the cavities provided in said connecting portions and being fixedly secured to the latter.

2. Elastic wedge means as set forth in claim 1, wherein each of said wedge plates including the connecting portion and guide wings thereof are shaped and arranged in such a manner so as to be best suited for forming said wedge plates by die-forging.

3. Elastic wedge means as set forth in claim 1, wherein each of said plates is formed with a central bore extending from the outer surface thereof through said connecting portion into said spherical end portion of said connecting means, and including welding material at least partly filling each of said bores to fixedly connect said end portion of said connecting means to said plates.

4. Elastic wedge means as set forth in claim 2, wherein each of said wedge-shaped plates has an inner bottom face substantially parallel to said end face of said seat portion and an annular rim projecting from said bottom face toward the other plate and increasing in height from one to the other end of said wedge means, said annular rim having an end face located in one plate with said guide face of the guide wings on the respective plate, said connecting portion of each plate being located in the space surrounded by said rim.

5. Elastic wedge means as set forth in claim 4, wherein the annular rim of each plate is formed in the region of the greatest height thereof with a recess facing the corresponding recess in the other plate, and wherein said connecting means has a portion extending with small clearance through said facing recesses, preventing thereby turning of said plates relative to each other.

6. Elastic wedge means as set forth in claim 5, wherein said connecting means include a connecting member located between said annular rim and an operating spindle fixedly connected to said connecting member and having a portion of enlarged diameter extending with small clearance through said facing recesses beyond said rim.

References Cited

UNITED STATES PATENTS

| | | | |
|---|---|---|---|
| 2,656,143 | 10/1953 | Fantz | 251—327 |
| 2,797,063 | 6/1957 | Hobbs | 251—327 |
| 3,052,446 | 9/1962 | Rosch | 251—327 |
| 3,149,818 | 9/1964 | Siepmann | 251—327 |
| 3,193,249 | 7/1965 | Bartholet | 251—327 |
| 3,215,399 | 11/1965 | McInerney | 251—327 X |

M. CARY NELSON, *Primary Examiner.*

A. ROSENTHAL, *Assistant Examiner.*